United States Patent
Ishioka et al.

(10) Patent No.: US 11,137,616 B2
(45) Date of Patent: Oct. 5, 2021

(54) DISPLAY DEVICE

(71) Applicant: Sony Interactive Entertainment Inc., Tokyo (JP)

(72) Inventors: Manabu Ishioka, Tokyo (JP); Shotaro Tada, Tokyo (JP); Yasutoshi Katsuda, Kanagawa (JP); Toshihiro Kusunoki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 148 days.

(21) Appl. No.: 16/623,211

(22) PCT Filed: Jul. 12, 2018

(86) PCT No.: PCT/JP2018/026333
§ 371 (c)(1),
(2) Date: Dec. 16, 2019

(87) PCT Pub. No.: WO2019/017274
PCT Pub. Date: Jan. 24, 2019

(65) Prior Publication Data
US 2021/0063760 A1    Mar. 4, 2021

(30) Foreign Application Priority Data
Jul. 19, 2017    (JP) .............................. JP2017-140078

(51) Int. Cl.
*G02B 27/28* (2006.01)
*G02B 5/30* (2006.01)
*G02B 27/00* (2006.01)

(52) U.S. Cl.
CPC ......... *G02B 27/283* (2013.01); *G02B 5/3025* (2013.01); *G02B 27/0018* (2013.01)

(58) Field of Classification Search
CPC .. G02B 27/28; G02B 27/283; G02B 27/0018; G02B 27/01; G02B 27/0101;
(Continued)

(56) References Cited

U.S. PATENT DOCUMENTS 5,966,242 A * 10/1999 Yamanaka ......... G02B 27/0172
359/618
6,710,928 B2    3/2004 Wouter
(Continued)

FOREIGN PATENT DOCUMENTS

CN    104267498 A    1/2015
CN    105629472 A    6/2016
(Continued)

OTHER PUBLICATIONS

Notice of Reasons for Refusal for corresponding Application JP 2019-531000, 6 pages, dated Jun. 12, 2020.
(Continued)

*Primary Examiner* — Stephone B Allen
*Assistant Examiner* — Adam W Booher
(74) *Attorney, Agent, or Firm* — Matthew B. Dernier, Esq.

(57) ABSTRACT

Provided is a display device in which generation of a ghost can be restrained. A polarizing plate is disposed adjacently to a display section. A ¼ wavelength plate is disposed adjacently to the polarizing plate. A polarizing plate is disposed adjacently to a lens. A ¼ wavelength plate is disposed adjacently to the polarizing plate. A beam splitter is disposed between the ¼ wavelength plate and the ¼ wavelength plate. The beam splitter is disposed at such a position that the air-equivalent optical path length of light that is reflected by the polarizing plate and is thereafter reflected by the beam splitter from emission of the light from the display section to transmission of the light through the
(Continued)

lens and the air-equivalent optical path length of light that is reflected by the beam splitter and is thereafter reflected by the polarizing plate from emission of the light from the display section to transmission of the light through the lens are equal.

3 Claims, 2 Drawing Sheets

(58) Field of Classification Search
CPC .............. G02B 27/0118; G02B 27/012; G02B 27/0121; G02B 27/017; G02B 27/0172; G02B 5/3025; G02B 5/30; G02B 5/3033
See application file for complete search history.

(56) References Cited

U.S. PATENT DOCUMENTS

| | | | |
|---|---|---|---|
| 6,853,491 B1 | 2/2005 | Ruhle | |
| 7,242,524 B2 | 7/2007 | Dike | |
| 8,493,520 B2 | 7/2013 | Gay | |
| 10,133,074 B2* | 11/2018 | Carollo | G02B 27/286 |
| 2001/0028332 A1 | 10/2001 | Wouter | |
| 2005/0111101 A1 | 5/2005 | Dike | |
| 2007/0070508 A1 | 3/2007 | Ruhle | |
| 2010/0177113 A1 | 7/2010 | Gay | |
| 2016/0291340 A1 | 10/2016 | Sharp | |
| 2018/0180889 A1 | 6/2018 | Lee | |

FOREIGN PATENT DOCUMENTS

| | | |
|---|---|---|
| CN | 206321882 U | 7/2017 |
| JP | 2003529795 A | 10/2003 |
| JP | 2007512581 A | 5/2007 |
| JP | 2007517241 A | 6/2007 |
| JP | 2010526321 A | 7/2010 |
| JP | 2018106160 A | 7/2018 |
| WO | 0175508 A1 | 10/2001 |
| WO | 2005052651 A1 | 6/2005 |
| WO | 2005054906 A1 | 6/2005 |
| WO | 2008149961 A1 | 12/2008 |

OTHER PUBLICATIONS

International Search Report for corresponding PCT Application No. PCT/JP2018/026333, 3 pages, dated Oct. 2, 2018.
International Preliminary Report on Patentability and Written Opinion for corresponding PCT Application No. PCT/JP2018/026333, 13 pages, dated Jan. 30, 2020.
First office Action for corresponding CN Application No. 201880046321.1, 16 pages, dated Apr. 25, 2021.

* cited by examiner

DISPLAY DEVICE

TECHNICAL FIELD

The present invention relates to a display device.

BACKGROUND ART

There is a head-mounted display which is mounted to a user's head and in which a video displayed on a display section is observed through a lens, whereby a video with presence can be appreciated.

SUMMARY

Technical Problems

In such a head-mounted display, for securing visibility of the video displayed, it is desirable that the length traveled by the video light emitted from the display section until the light reaches the user's eyes is set as long as possible.

Here, in order to reduce the size of the head-mounted display while securing the aforementioned length, it may be contemplated to cause the video light emitted from the display section to be reflected a few times until reaching the user's eyes.

In this case, however, a ghost generated due to light reaching the user's eyes through another optical path different in air-equivalent optical path length from the video light displayed would be visually recognized by the user, and, as a result, the video displayed might become difficultly visible. In addition, part of the light emitted from the display section would not become light of a video but would become light of a ghost, whereby the displayed video might be darkened. Besides, the above-mentioned problems are not limited to the case of the head-mounted display but are similarly generated also in the cases of, for example, a display device in which the length between the video displayed and the person viewing the video is limited, such as an in-vehicle meter.

The present invention has been made in consideration of the above-mentioned problems. One of objects of the present invention is to provide a display device capable of restraining generation of a ghost.

Solution to Problems

In order to solve the above-mentioned problems, according to the present invention, there is provided a display device including: a display section that displays a video; a lens; a first polarizing plate disposed adjacently to the display section; a first ¼ wavelength plate disposed adjacently to the first polarizing plate; a second polarizing plate disposed adjacently to the lens; a second ¼ wavelength plate disposed adjacently to the second polarizing plate; and a beam splitter disposed between the first ¼ wavelength plate and the second ¼ wavelength plate, in which the beam splitter is disposed at such a position that an air-equivalent optical path length of first light that is reflected by the second polarizing plate and is thereafter reflected by the beam splitter from emission of the first light from the display section to transmission of the first light through the lens and an air-equivalent optical path length of second light that is reflected by the beam splitter and is thereafter reflected by the first polarizing plate from emission of the second light from the display section to transmission of the second light through the lens are equal.

In a mode of the present invention, the beam splitter is disposed at such a position that an air-equivalent optical path length from a surface on the lens side of the first ¼ wavelength plate to a mirror surface of the beam splitter and an air-equivalent optical path length from a surface on the display section side of the second ¼ wavelength plate to the mirror surface of the beam splitter are equal.

In addition, in a mode of the present invention, the first polarizing plate is in contact with the first ¼ wavelength plate, and the second polarizing plate is in contact with the second ¼ wavelength plate.

DESCRIPTION OF EMBODIMENT

An embodiment of the present invention will be described in detail below, based on the drawings.

Figure 1:
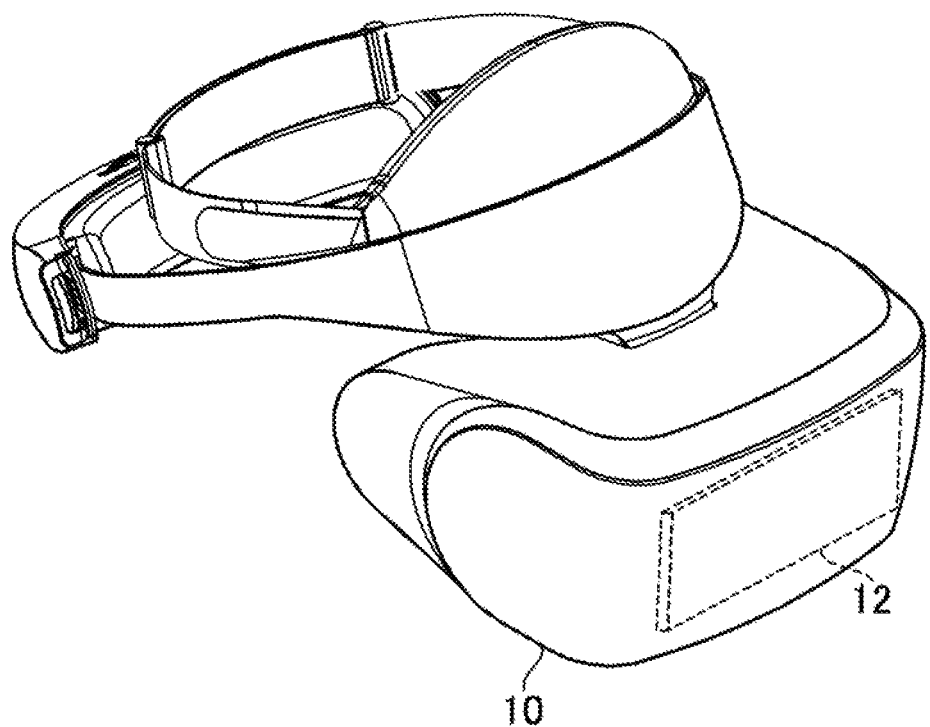
FIG. 1 is an external view depicting an example of head-mounted display according to one embodiment of the present invention.
Figure 2:
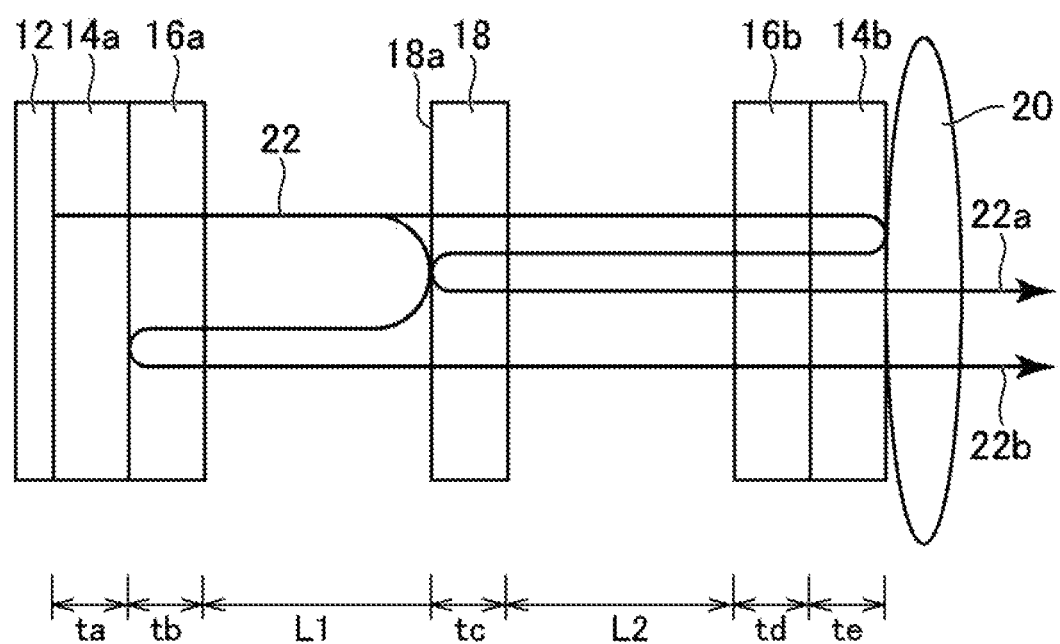
FIG. 2 is a schematic view depicting schematically an example of an optical system of the head-mounted display illustrated in FIG. 1.

FIG. 1 is an external view depicting an example of a head-mounted display (HMD) 10 according to the embodiment of the present invention. FIG. 2 is a diagram depicting schematically an example of an optical system of the HMD 10 illustrated in FIG. 1.

As illustrated in FIGS. 1 and 2, the optical system of the HMD 10 according to the present embodiment includes a display section 12, a first polarizing plate 14a, a second polarizing plate 14b, a first ¼ wavelength plate 16a, a second ¼ wavelength plate 16b, a beam splitter 18, and a lens 20.

The first polarizing plate 14a is disposed adjacently to the display section 12. In addition, the first ¼ wavelength plate 16a is disposed adjacently to the first polarizing plate 14a. Besides, the second polarizing plate 14b is disposed adjacently to the lens 20. In addition, the second ¼ wavelength plate 16b is disposed adjacently to the second polarizing plate 14b. Besides, the beam splitter 18 is disposed between the first ¼ wavelength plate 16a and the second wavelength plate 16b. In this way, in the optical system of the HMD 10 according to the present embodiment, the display section 12, the first polarizing plate 14a, the first ¼ wavelength plate 16a, the beam splitter 18, the second ¼ wavelength plate 16b, the second polarizing plate 14b, and the lens 20 are disposed adjacently to one another in this order.

As depicted in FIG. 1, the display section 12 is a display such as, for example, a liquid crystal display or an organic electronic luminescent (EL) display which is disposed on a front side of the HMD 10. The display section 12 displays a video such as, for example, a video stored in the HMD 10 or a video represented by a video signal transmitted from a device capable of communication with the HMD 10. The display section 12 according to the present embodiment is configured to be able to display a three-dimensional image by displaying an image for the left eye and an image for the right eye, for example. Note that the display section 12 may be one that cannot display a three-dimensional image but can only display a two-dimensional image.

In the present embodiment, the first polarizing plate 14a and the second polarizing plate 14b are optical elements that transmit, for example, light of linearly polarized light component, of the incident light. Here, for example, both the first polarizing plate 14a and the second polarizing plate 14b transmit light of linearly polarized light component in the same direction (for example, in the vertical direction).

In the present embodiment, the first ¼ wavelength plate 16a and the second ¼ wavelength plate 16b are, for example, optical elements that convert linearly polarized light of incident light into circularly polarized light and emit the circularly polarized light, and convert circularly polarized light of incident light into linearly polarized light and emit the linearly polarized light.

In the first ¼ wavelength plate 16a and the second ¼ wavelength plate 16b, the change in polarized light differs according to the traveling direction of the incident light.

In the example of FIG. 2, for example, when linearly polarized light in the vertical direction is incident rightward in FIG. 2 on the first ¼ wavelength plate 16a and the second ¼ wavelength plate 16b, circularly polarized light in clockwise direction as viewed along the traveling direction of light is emitted. In addition, for example, when circularly polarized light in the clockwise direction as viewed along the traveling direction of light is incident rightward in FIG. 2, linearly polarized light in the horizontal direction is emitted. Besides, for example, when linearly polarized light in the horizontal direction is incident rightward in FIG. 2, circularly polarized light in counterclockwise direction as viewed along the traveling direction of light is emitted. In addition, for example, when circularly polarized light in the counterclockwise direction as viewed along the traveling direction of light is incident rightward in FIG. 2, linearly polarized light in the vertical direction is emitted.

Besides, for example, when linearly polarized light in the vertical direction is incident leftward in FIG. 2, circularly polarized light in counterclockwise direction as viewed along the traveling direction of light is emitted. In addition, for example, when circularly polarized light in counterclockwise direction as viewed along the traveling direction of light is incident leftward in FIG. 2, linearly polarized light in the horizontal direction is emitted. Besides, for example, when linearly polarized light in the horizontal direction is incident leftward in FIG. 2, circularly polarized light in clockwise direction as viewed along the traveling direction of light is emitted. In addition, for example, when circularly polarized light in clockwise direction as viewed along the traveling direction of light is incident leftward in FIG. 2, linearly polarized light in the vertical direction is emitted.

Here, the orientation of the optical axis of the first ¼ wavelength plate 16a in relation to the polarizing direction of the first polarizing plate 14a should be set strictly. Therefore, the first polarizing plate 14a and the first ¼ wavelength plate 16a may be set in contact with each other. As a result, the setting of the orientation of the optical axis of the first ¼ wavelength plate 16a in relation to the polarizing direction of the first polarizing plate 14a is facilitated. Similarly, the orientation of the optical axis of the second ¼ wavelength plate 16b in relation to the polarizing direction of the second polarizing plate 14b should be set strictly. Therefore, the second polarizing plate 14b and the second ¼ wavelength plate 16b may be set in contact with each other. As a result, the setting of the orientation of the optical axis of the second ¼ wavelength plate 16b in relation to the polarizing direction of the second polarizing plate 14b is facilitated.

In the present embodiment, the beam splitter 18 is, for example, an optical element that transmits part of the incident light and reflects the remainder of the incident light at a mirror surface 18a. As depicted in FIG. 2, the mirror surface 18a may be a surface on the display section 12 side of the beam splitter 18. Here, as the beam splitter 18, there can be used a half mirror that transmits half of the incident light and reflects the remaining half of the incident light at the mirror surface 18a.

The lens 20 is an optical element that refracts the incident light and converges the light onto the user's eye.

As depicted in FIG. 2, in the present embodiment, the display section 12 emits light 22 which is video light, as aforementioned. Of the light 22 emitted by the display section 12, only the light 22 of linearly polarized light component in the vertical direction is transmitted through the first polarizing plate 14a.

Then, the light 22 is transmitted through the first ¼ wavelength plate 16a, thereby being converted into circularly polarized light 22 in clockwise direction as viewed along the traveling direction of light.

Then, part of the light 22 is transmitted through the beam splitter 18, while the remainder is reflected at the mirror surface 18a. For example, one half of the light 22 is transmitted through the beam splitter 18, and the remaining half is reflected at the mirror surface 18a. The light 22 reflected at the mirror surface 18a becomes circularly polarized light in counterclockwise direction as viewed along the traveling direction of light. Hereinafter, the light 22 transmitted through the beam splitter 18 will be referred to as first light 22a, while the light 22 reflected by the beam splitter 18 will be referred to as second light 22b.

The first light 22a transmitted through the beam splitter 18 is transmitted through the second ¼ wavelength plate 16b, thereby being converted into linearly polarized light in the horizontal direction. Then, the first light 22a is reflected by the second polarizing plate 14b.

The first light 22a that is reflected by the second polarizing plate 14b and that is linearly polarized light in the horizontal direction is transmitted through the second ¼ wavelength plate 16b, thereby being converted into circularly polarized light in clockwise direction as viewed along the traveling direction of light.

Part of the first light 22a that is transmitted through the second ¼ wavelength plate 16b and that is circularly polarized light in clockwise direction as viewed along the traveling direction of light is reflected by the beam splitter 18, thereby being converted into circularly polarized light in counterclockwise direction as viewed along the traveling direction of light. Note that while the remainder of the first light 22a is transmitted through the beam splitter 18, this light little influences the user's sense of vision, and, therefore, it is omitted in the following description.

The first light 22a that is reflected by the beam splitter 18 and that is circularly polarized light in counterclockwise direction as viewed along the traveling direction of light is transmitted through the second ¼ wavelength plate 16b, thereby being converted into linearly polarized light in the vertical direction. Then, the first light 22a is transmitted through the second polarizing plate 14b and the lens 20, to reach the user's eye.

On the other hand, the second light 22b that is reflected by the beam splitter 18 and that is circularly polarized light in counterclockwise direction as viewed along the traveling direction of light is transmitted through the first ¼ wavelength plate 16a, thereby being converted into linearly polarized light in the horizontal direction. Then, the second light 22b is reflected by the first polarizing plate 14a.

The second light 22b that is reflected by the first polarizing plate 14 and that is linearly polarized light in the horizontal direction is transmitted through the first ¼ wavelength plate 16a, thereby being converted into circularly polarized light in counterclockwise direction as viewed along the traveling direction of light.

Then, part of the second light 22b that is transmitted through the first ¼ wavelength plate 16a and that is circularly polarized light in counterclockwise direction as viewed along the traveling direction of light is transmitted through the beam splitter 18. Note that while the remainder of the second light 22b is reflected at the mirror surface 18a of the beam splitter 18, this light little influences the user's sense of vision, and, therefore, it is omitted in the following description.

The second light 22b that is transmitted through the beam splitter 18 and that is circularly polarized light in counterclockwise direction as viewed along the traveling direction of light is transmitted through the second ¼ wavelength plate 16b, thereby being converted into linearly polarized light in the vertical direction. Then, the second light 22b is transmitted through the second polarizing plate 14b and the lens 20, to reach the user's eye.

Here, where the air-equivalent optical path length of the first light 22a and the air-equivalent optical path length of the second light 22b are different, ghosting might occur, resulting in that the displayed video might be difficult to see. In addition, part of the light emitted from the display section 12 might not become light of the video displayed, but might become light of ghost, and the displayed video might be darkened.

In view of this, in the present embodiment, the air-equivalent optical path length of the first light 22a and the air-equivalent optical path length of the second light 22b are made to be equal in the following manner.

Figure 3:
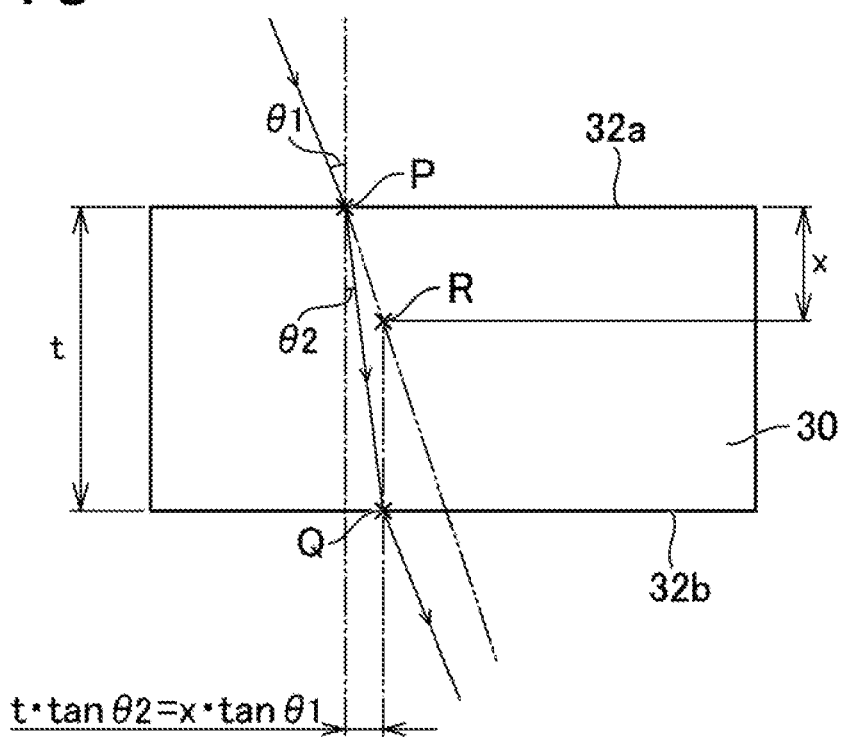
FIG. 3 is an illustration explaining an air-equivalent optical path length.

Here, referring to FIG. 3, the air-equivalent optical path length will be described. As depicted in FIG. 3, a medium 30 which has a thickness t and has a refractive index n is assumed. It is assumed that at a position P on a boundary surface 32a on the incidence side between air and the medium 30, light incident from air into the medium 30 at an incident angle θ1 travels in the medium 30 with a refractive angle θ2.

Then, this light goes out of the medium 30 at a position Q on a boundary surface 32b on the emission side between air and the medium 30. Note that the boundary surface 32a and the boundary surface 32b are parallel. Besides, a position corresponding to the position Q of this light when the medium 30 is assumed to be air is made to be a position R. Here, for example, as depicted in FIG. 3, the position of an intersection between a line obtained by extending the light incident on the medium 30 at the position P and a normal to the boundary surface 32b that passes through the position Q is the position R. Then, the length from the boundary surface 32a to the position R is made to be x.

In this case, according to Snell's law, a relation of $\sin\theta_1 = n \cdot \sin\theta_2$ is established. Note that the refractive index of air is made to be 1 here. A relation of $x \cdot \tan\theta_1 = t \cdot \tan\theta_2$ is also established. Therefore, $x = (t/n) \cdot (\cos\theta_1/\cos\theta_2)$. When an approximation by an assumption that θ1 and θ2 are both sufficiently small is introduced here, a relation of $x = t/n$ is established. Therefore, the air-equivalent optical path length of the medium 30 having the thickness t and the refractive index n is $t/n$.

On the basis of the foregoing, the air-equivalent optical path length of the first light 22a is $ta/na + tb/nb + L1 + 3 \cdot tc/nc + 3L2 + 3 \cdot td/nd + te/ne$. In addition, the air-equivalent optical path length of the second light 22b is $ta/na + 3 \cdot tb/nb + 3L1 + tc/nc + L2 + td/nd + te/ne$.

Note that in the above-mentioned formulas, as depicted in FIG. 2, the thicknesses of the first polarizing plate 14a, the first ¼ wavelength plate 16a, the beam splitter 18, the second ¼ wavelength plate 16b, and the second polarizing plate 14b are expressed as ta, tb, tc, td and te, respectively.

In addition, the length between the surface on the lens 20 side of the first ¼ wavelength plate 16a and the surface (mirror surface 18a) on the display section 12 side of the beam splitter 18 is expressed as L1. Besides, the length between the surface on the lens 20 side of the beam splitter 18 and the surface on the display section 12 side of the second ¼ wavelength plate 16b is expressed as L2.

In addition, the refractive indices of the first polarizing plate 14a, the first ¼ wavelength plate 16a, the beam splitter 18, the second ¼ wavelength plate 16b and the second polarizing plate 14b are expressed as na, nb, nc, nd and ne, respectively.

In this case, a relational expression of $L1 = L2 + tc/nc + td/nd - tb/nb$ is deduced. Then, in the present embodiment, the beam splitter 18 is disposed at such a position that the air-equivalent optical path length of the first light 22a and the air-equivalent optical path length of the second light 22b will be equal, that is, at such a position that the aforementioned relation is established between L1 and L2.

Here, for example, it is assumed that the first ¼ wavelength plate 16a and the second ¼ wavelength plate 16b are equal in thickness and in refractive index. In this case, the value of $td/nd - tb/nb$ is 0. In this case, therefore, a relation of $L1 = L2 + tc/nc$ is established. This relational expression means that the air-equivalent optical path length from the surface on the lens 20 side of the first ¼ wavelength plate 16a to the mirror surface 18a of the beam splitter 18 and the air-equivalent optical path length from the surface on the display section 12 side of the second ¼ wavelength plate 16b to the mirror surface 18a of the beam splitter 18 are equal.

Then, on the basis of the foregoing and of that the first ¼ wavelength plate 16a and the second ¼ wavelength plate 16b are highly possibly equal in thickness and in refractive index, the beam splitter 18 may be disposed at a position where the relation of $L1 = L2 + tc/nc$ is established. For example, the beam splitter 18 may be disposed at such a position that the air-equivalent optical path length from the surface on the lens 20 side of the first ¼ wavelength plate 16a to the mirror surface 18a and the air-equivalent optical path length from the surface on the display section 12 side of the second ¼ wavelength plate 16b to the mirror surface 18a will be equal.

In addition, in the present embodiment, the layout of each member is determined in such a manner that the air-equivalent optical path length of the first light 22a and the air-equivalent optical path length of the second light 22b are both equal to a focal distance fO of the lens 20.

Here, the air-equivalent optical path length of the first light 22a and the air-equivalent optical path length of the second light 22b are fO. In this case, a relational expression of $L1 = fO/4 \cdot ta/(4 \cdot na) - tb/nb - te/(4 \cdot ne)$ and a relational expression of $L2 = fO/4 - ta/(4 \cdot na) - tc/nc - td/nd - te/(4 \cdot ne)$ are deduced. On the basis of this, the display section 12, the first polarizing plate 14a, the first ¼ wavelength plate 16a, the beam splitter 18, the second ¼ wavelength plate 16b, the second polarizing plate 14b and the lens 20 may be disposed at such positions that these relational expressions are satisfied.

In the present embodiment, as described above, the beam splitter 18 is disposed at such a position that the air-equivalent optical path length of the first light 22a and the air-equivalent optical path length of the second light 22*b* are equal. In other words, the beam splitter 18 is disposed at such a position as to satisfy the relational expression of L1=L2+tc/nc+td/nd−tb/nb between L1 and L2. In this way, according to the present embodiment, generation of ghost can be restrained.

Note that the present invention is not to be limited by the above-described embodiment.

For example, the present embodiment may be applied to a display device other than the HMD 10, for example, a display device in which the length between the displayed video and the viewer is limited, such as an in-vehicle meter.

In addition, the specific character strings and numerical values in the above description and the specific character strings and numerical values in the drawings are mere examples, and these character strings and numerical values are not limitative.

The invention claimed is:

1. A display device comprising:
a display section that displays a video;
a lens;
a first polarizing plate disposed adjacently to the display section;
a first ¼ wavelength plate disposed adjacently to the first polarizing plate;
a second polarizing plate disposed adjacently to the lens;
a second ¼ wavelength plate disposed adjacently to the second polarizing plate; and
a beam splitter disposed between the first ¼ wavelength plate and the second ¼ wavelength plate,
wherein the beam splitter is disposed at such a position that an air-equivalent optical path length of first light that is reflected by the second polarizing plate and is thereafter reflected by the beam splitter from emission of the first light from the display section to transmission of the first light through the lens and an air-equivalent optical path length of second light that is reflected by the beam splitter and is thereafter reflected by the first polarizing plate from emission of the second light from the display section to transmission of the second light through the lens are equal.

2. The display device according to claim 1, wherein the beam splitter is disposed at such a position that an air-equivalent optical path length from a surface on the lens side of the first ¼ wavelength plate to a mirror surface of the beam splitter and an air-equivalent optical path length from a surface on the display section side of the second ¼ wavelength plate to the mirror surface of the beam splitter are equal.

3. The display device according to claim 1, wherein
the first polarizing plate is in contact with the first ¼ wavelength plate, and
the second polarizing plate is in contact with the second ¼ wavelength plate.

* * * * *